United States Patent
Hsu

(10) Patent No.: US 11,782,335 B2
(45) Date of Patent: Oct. 10, 2023

(54) COLOR WHEEL MODULE AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/983,276

(22) Filed: Nov. 8, 2022

(65) Prior Publication Data

US 2023/0142610 A1    May 11, 2023

(30) Foreign Application Priority Data

Nov. 11, 2021    (CN) .......................... 202111330991.6

(51) Int. Cl.
*G03B 21/20*    (2006.01)
*G02B 26/00*    (2006.01)

(52) U.S. Cl.
CPC ......... *G03B 21/204* (2013.01); *G02B 26/008* (2013.01)

(58) Field of Classification Search
CPC .............................. G02B 26/008; G03B 21/204
See application file for complete search history.

(56) References Cited

U.S. PATENT DOCUMENTS

| 2015/0146174 A1* | 5/2015 | Ferri .................... G03B 21/204 353/31 |
| 2022/0121093 A1* | 4/2022 | Dai ...................... G02B 5/0278 |

FOREIGN PATENT DOCUMENTS

| CN | 106444251 | 2/2017 |
| CN | 207164450 | 3/2018 |
| CN | 108931878 | 12/2018 |
| CN | 109991802 | 7/2019 |

* cited by examiner

*Primary Examiner* — Evan P Dzierzynski
*Assistant Examiner* — Nathaniel J Lee
(74) *Attorney, Agent, or Firm* — JCIPRNET

(57) ABSTRACT

A color wheel module includes a driving assembly, a substrate, a first wavelength conversion layer, and a second wavelength conversion layer. The substrate includes an outer periphery disposed around the central axis and a first surface perpendicular to the central axis, and has a first light conversion region located on the outer periphery and a second light conversion region located on the first surface. The first wavelength conversion layer is disposed on the first light conversion region. The second wavelength conversion layer is disposed on the second light conversion region. The first excitation beam is incident to the first light conversion region along a direction perpendicular to the central axis and is converted into a first color converted beam. The second excitation beam is incident to the second light conversion region along a direction parallel to the central axis and is converted into a second color converted beam.

10 Claims, 8 Drawing Sheets

COLOR WHEEL MODULE AND PROJECTION DEVICE

CROSS-REFERENCE TO RELATED APPLICATION

This application claims the priority benefit of China application serial no. 202111330991.6 filed on Nov. 11, 2021. The entirety of the above-mentioned patent application is hereby incorporated by reference herein and made a part of this specification.

BACKGROUND

Technical Field

The invention relates to an optical module and a projection device, and particularly relates to a color wheel module and a projection device using the color wheel module.

Description of Related Art

At present, a wavelength conversion region of a phosphor color wheel is usually disposed on a radial disk surface of a heat dissipation substrate. The radial disk surface and a rotating shaft of the phosphor color wheel are perpendicular to each other, and the wavelength conversion region is disposed around the rotating shaft in a circular arrangement.

However, currently the wavelength conversion region is disposed on the radial disk surface of the heat dissipation substrate, so the flexibility of spatial configuration of the phosphor color wheel in an optical engine of the projector is limited, and light paths of incident light and emitting light of the wavelength conversion region may only be configured along a direction parallel to an axial direction, which greatly limits the spatial arrangement of the optical engine of the projector. Moreover, a wavelength conversion layer disposed on the wavelength conversion region may produce a large amount of heat after being excited by excitation light, and the heat needs to be dissipated through the heat dissipation substrate to reduce the temperature of the wavelength conversion layer and improve the excitation efficiency of the wavelength conversion layer. Furthermore, the heat dissipation efficiency of the wavelength conversion layer is related to the position of the wavelength conversion layer on the heat dissipation substrate, and when the wavelength conversion layer is disposed at a position closer to the outer circumference of the heat dissipation substrate, the phosphor color wheel has better heat dissipation efficiency due to a greater linear velocity of the phosphor color wheel during rotation. However, at present, since an average position of the wavelength conversion layer in the phosphor color wheel cannot be disposed on the outermost outer circumference of the heat dissipation substrate, the heat dissipation effect of the phosphor color wheel is limited. In addition, different wavelength conversion layers on the same surface cannot be excited at the same time and are required to be separately excited at different time periods through timing control, which results in poor excitation efficiency and poor heat dissipation effect.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a color wheel module, which has a better heat dissipation effect.

The invention is directed to a projection device, which includes the aforementioned color wheel module and has better projection quality and product competitiveness.

Other objects and advantages of the invention may be further illustrated by the technical features broadly embodied and described as follows.

In order to achieve one or a portion of or all of the objects or other objects, an embodiment of the invention provides a color wheel module, which is adapted to be disposed on a transmission path of a first excitation beam and a second excitation beam. The color wheel module includes a driving assembly, a substrate, a first wavelength conversion layer, and a second wavelength conversion layer. The substrate is connected to a rotating shaft of the driving assembly, and the driving assembly drives the substrate to rotate while taking the rotating shaft of the driving assembly as a central axis. The substrate includes an outer periphery disposed around the central axis and a first surface perpendicular to the central axis, and has a first light conversion region located on the outer periphery and a second light conversion region located on the first surface. An included angle is formed between an extending direction of the outer periphery and a radial direction of the substrate, and the outer periphery has a width parallel to the extending direction. The first wavelength conversion layer is disposed on the first light conversion region of the substrate. The second wavelength conversion layer is disposed on the second light conversion region of the substrate. The first excitation beam is incident to the first light conversion region of the substrate along a direction perpendicular to the central axis and is converted into a first color converted beam. The second excitation beam is incident to the second light conversion region of the substrate along a direction parallel to the central axis and is converted into a second color converted beam.

In order to achieve one or a portion of or all of the objects or other objects, an embodiment of the invention provides a projection device including an illumination module, a light valve and a projection lens. The illumination module includes a light source device, a lens, and a color wheel module for providing an illumination beam. The light source device is configured to provide a first excitation beam and a second excitation beam. The color wheel module is disposed on a transmission path of the first excitation beam and the second excitation beam. The color wheel module is located between the light source device and the light valve, and the lens is located between the light source device and the color wheel module. The color wheel module includes a driving assembly, a substrate, a first wavelength conversion layer, and a second wavelength conversion layer. The substrate is connected to a rotating shaft of the driving assembly, and the driving assembly drives the substrate to rotate while taking the rotating shaft of the driving assembly as a central axis. The substrate includes an outer periphery disposed around the central axis and a first surface perpendicular to the central axis, and has a first light conversion region located on the outer periphery and a second light conversion region located on the first surface. An included angle is formed between an extending direction of the outer periphery and a radial direction of the substrate, and the outer periphery has a width parallel to the extending direction. The first wavelength conversion layer is disposed on the first light conversion region of the substrate. The second wavelength conversion layer is disposed on the second light conversion region of the substrate. The first excitation beam is incident to the first light conversion region of the substrate along a direction perpendicular to the central axis and is converted into a first color converted beam. The second excitation beam is incident to the second light conversion region of the substrate along a direction parallel to the central axis and is converted into a second color converted beam. The illumination beam includes at least one of the first color converted beam and the second color converted beam. The light valve is disposed on a transmission path of the illumination beam to convert the illumination beam into an image beam. The projection lens is disposed on a transmission path of the image beam to project the image beam out of the projection device.

Based on the above description, the embodiments of the invention have at least one of the following advantages or effects. In the design of the color wheel module of the invention, the first wavelength conversion layer is disposed on the first light conversion region of the outer periphery of the substrate, and the second wavelength conversion layer is disposed on the second light conversion region of the first surface of the substrate, where the first excitation beam is incident to the first light conversion region of the substrate in a direction perpendicular to the central axis and is converted into the first color converted beam, and the second excitation beam is incident to the second light conversion region of the substrate in a direction parallel to the central axis and is converted into the second color converted beam. In this way, there is no need to generate excitation light of different colors through timing control, which improves application efficiency of the excitation light. At the same time, since bonding areas of the first wavelength conversion layer and the second wavelength conversion layer with the substrate are at least doubled, heat dissipation efficiency of the wavelength conversion layer is also greatly improved, and the color wheel module of the invention has a better heat dissipation effect. Furthermore, through the configuration method, flexibility in spatial design of a system optical engine may be increased. In addition, the projection device using the color wheel module of the invention may have better projection quality and product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
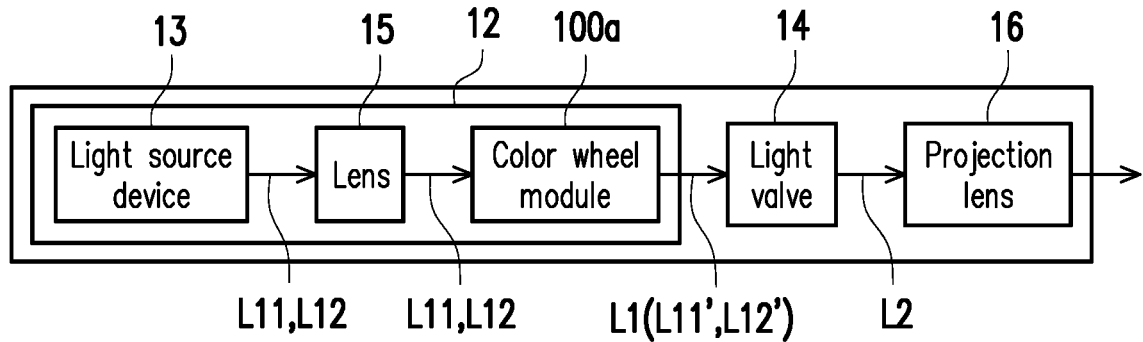
FIG. 1 is a schematic diagram of a projection device according to an embodiment of the invention.
Figure 2A:
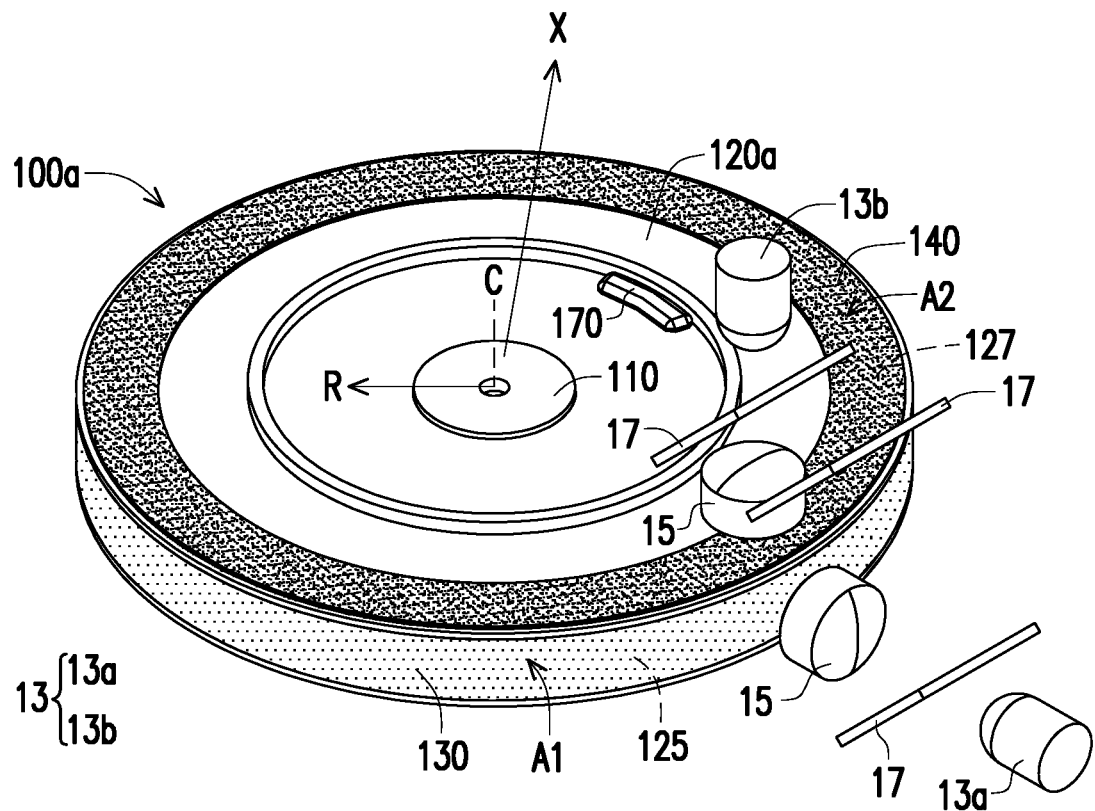
FIG. 2A is a three-dimensional schematic view of relative positions of a color wheel module and a light guide element of the projection device of FIG. 1.
Figure 2B:
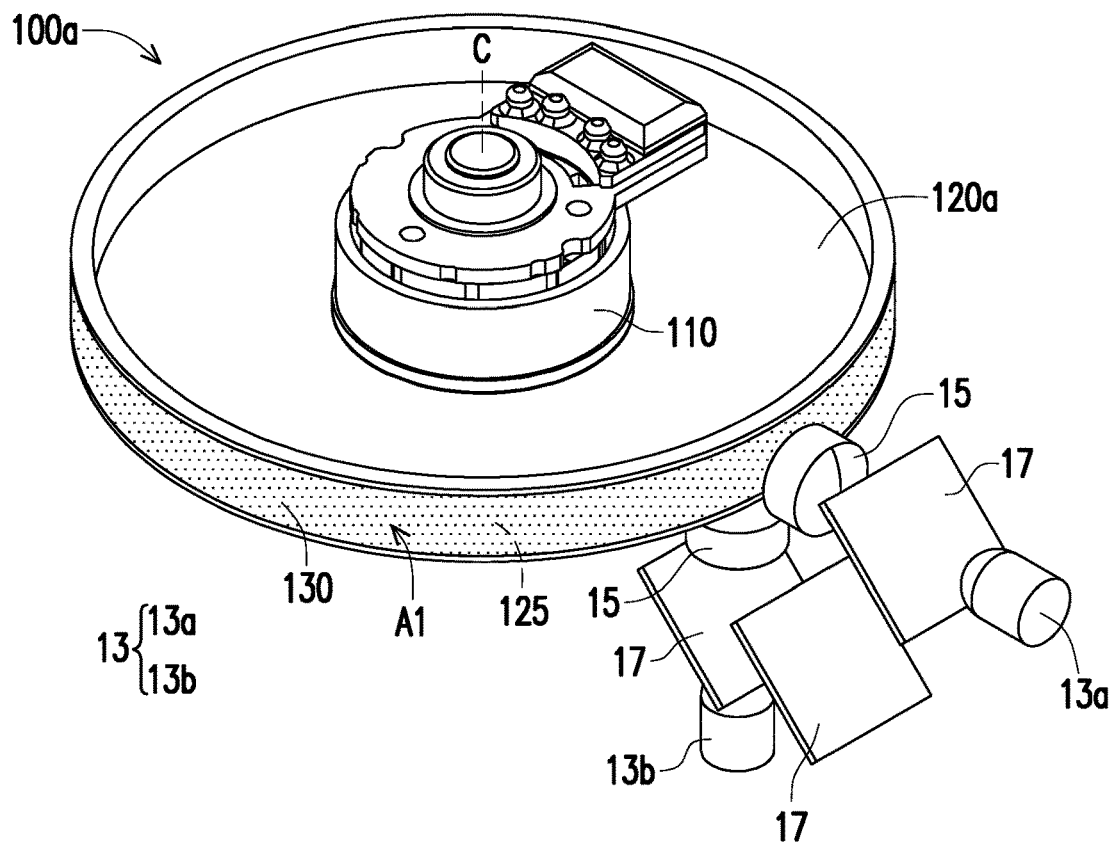
FIG. 2B is a three-dimensional schematic view of relative positions of the color wheel module and the light guide element of FIG. 2A from another viewing angle.
Figure 2C:
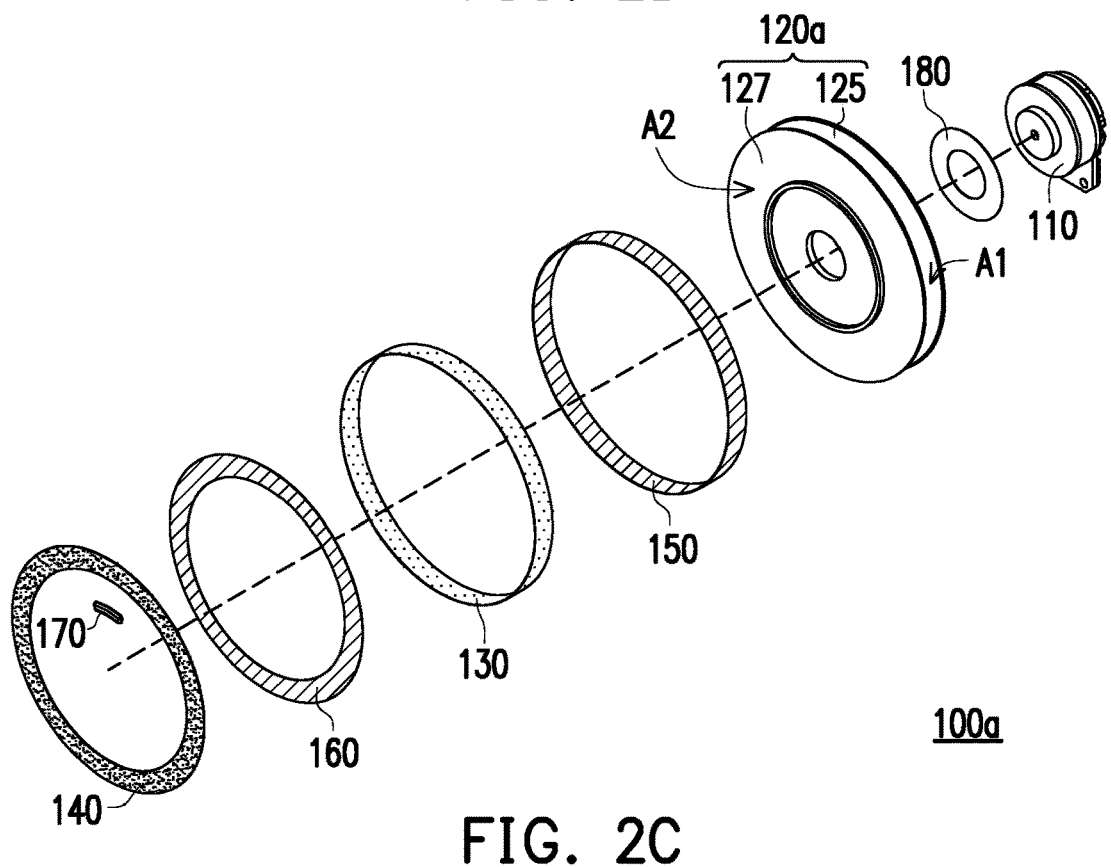
FIG. 2C is a three-dimensional exploded schematic view of the color wheel module of FIG. 2A.
Figure 2D:
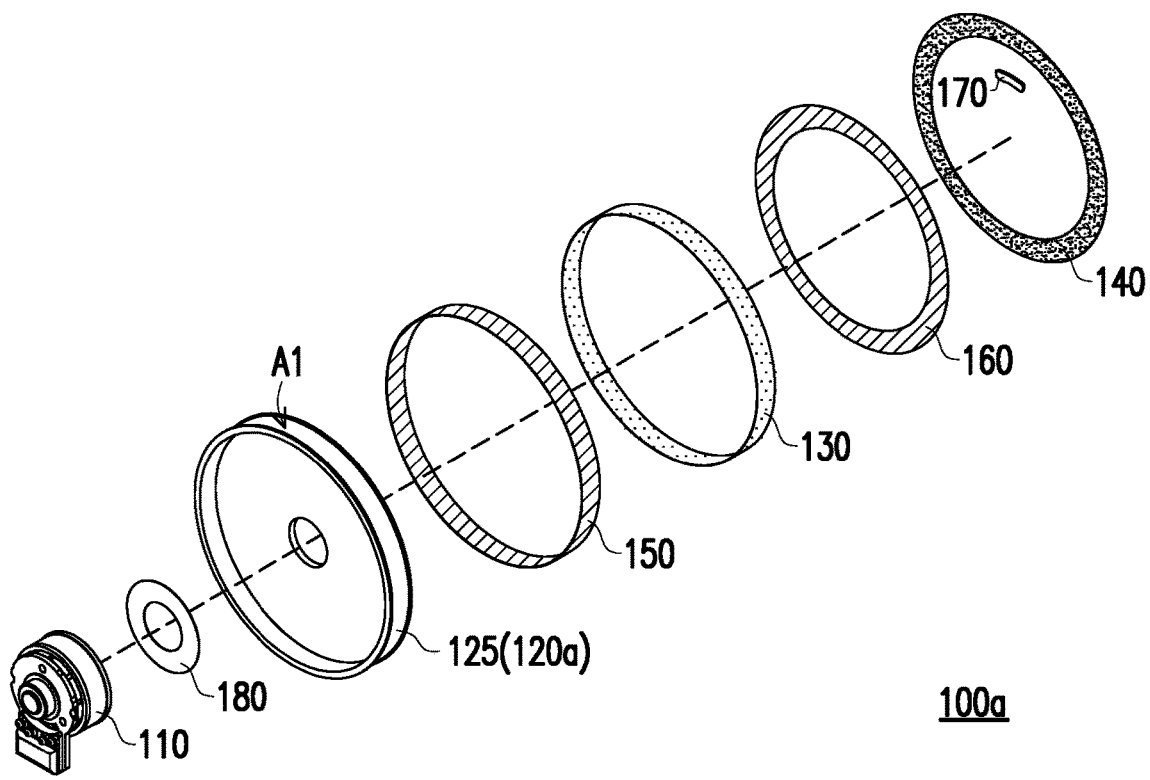
FIG. 2D is a three-dimensional exploded schematic view of the color wheel module of FIG. 2A from another viewing angle.
Figure 2E:
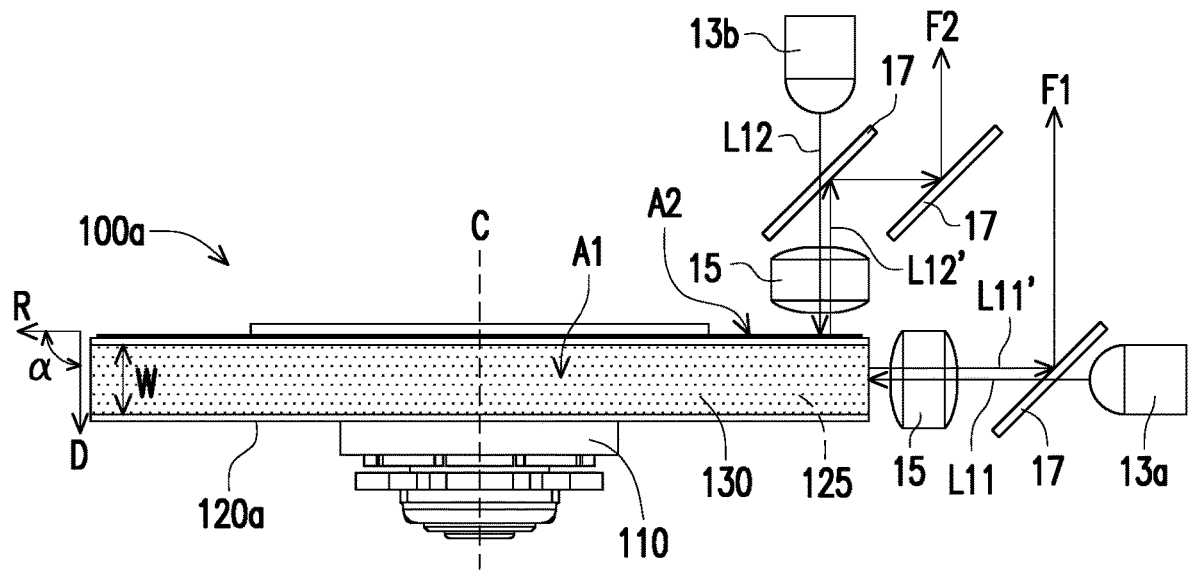
FIG. 2E is a schematic side view of the relative positions of the color wheel module and the light guide element of FIG. 2A.

FIG. 1 is a schematic diagram of a projection device according to an embodiment of the invention. FIG. 2A is a three-dimensional schematic view of relative positions of a color wheel module and a light guide element of the projection device of FIG. 1. FIG. 2B is a three-dimensional schematic view of relative positions of the color wheel module and the light guide element of FIG. 2A from another viewing angle. FIG. 2C is a three-dimensional exploded schematic view of the color wheel module of FIG. 2A. FIG. 2D is a three-dimensional exploded schematic view of the color wheel module of FIG. 2A from another viewing angle. FIG. 2E is a schematic side view of the relative positions of the color wheel module and the light guide element of FIG. 2A.

Referring to FIG. 1, in the embodiment, the projection device 10 includes an illumination module 12, a light valve 14 and a projection lens 16. The illumination module 12 includes a light source device 13, at least one lens 15, and a color wheel module 100a, and the illumination module 12 is configured to provide an illumination beam L1. The light source device 13 is configured to provide a first excitation beam L11 and a second excitation beam L12. The color wheel module 100a is disposed on a transmission path of the first excitation beam L11 and the second excitation beam L12 coming from the light source device 13. The color wheel module 100a is located between the light source device 13 and the light valve 14, and the at least one lens 15 is located between the light source device 13 and the color wheel module 100a. The light valve 14 is disposed on a transmission path of the illumination beam L1 to convert the illumination beam L1 into an image beam L2. The projection lens 16 is disposed on a transmission path of the image beam L2 coming from the light valve 14, and is configured to project the image beam L2 out of the projection device 10 to form an image (not shown) on a projection surface.

Further, the light source device 13 used in the embodiment is, for example, a laser diode (LD), such as a laser diode bank. To be specific, any light source that meets a volume requirement in an actual design of the projection device may be applied, which is not limited by the invention. The light valve 14 is, for example, a reflective light modulator such as a liquid crystal on silicon panel (LCoS panel), a digital micro-mirror device (DMD), etc. In one embodiment, the light valve 14 is, for example, a transmissive light modulator such as a transparent liquid crystal panel, an electro-optical modulator, a magneto-optic modulator, an acousto-optic modulator (AOM), etc., but the pattern and type of the light valve 14 are not limited by the embodiment. Regarding the method for the light valve 14 converting the illumination beam L1 into the image beam L2, sufficient teaching, suggestions and implementation descriptions may be obtained from general knowledge of the technical field for detailed steps and implementation of the above method, and details thereof are not repeated. In addition, the projection lens 16 includes, for example, a combination of one or a plurality of optical lenses having refracting powers, such as various combinations of non-planar lenses such as a biconcave lens, a biconvex lens, a concavo-convex lens, a convexo-concave lens, a plano-convex lens, a plano-concave lens, etc. In an embodiment, the projection lens 16 may also include a planar optical lens, which receives the image beam L2 from the light valve 14 in a reflective or transmissive manner and projects the image beam L2 out of the projection device 10. The embodiment does not limit the pattern and type of the projection lens 16.

Referring to FIG. 2A, FIG. 2B, FIG. 2C, FIG. 2D and FIG. 2E at the same time, in the embodiment, the color wheel module 100a includes a driving assembly 110, a substrate 120a, a first wavelength conversion layer 130 and a second wavelength conversion layer 140. The substrate 120a is connected to a rotating shaft X of the driving assembly 110, and the driving assembly 110 is configured to drive the substrate 120a to rotate while taking the rotating shaft X of the driving assembly 110 as a central axis C, where the central axis C is, for example, a rotation central line of the substrate 120a. The substrate 120a includes an outer periphery 125 arranged round the central axis C and a first surface 127 perpendicular to the central axis C. The first surface 127 is, for example, connected to the outer periphery 125, and the first surface 127 is parallel to a radial direction R. The substrate 120a has a first light conversion region A1 located on the outer periphery 125 and a second light conversion region A2 located on the first surface 127. An included angle α is formed between an extending direction D of the outer periphery 125 and the radial direction R of the substrate 120a, and the outer periphery 125 has a width W parallel to the extending direction D, where the radial direction R is perpendicular to the central axis C. The included angle α is, for example, greater than 0 and less than or equal to 90 degrees. Preferably, the outer periphery 125 and the radial direction R present 90 degrees (the included angle α is 90 degrees), i.e. the extending direction D of the outer periphery 125 is parallel to the central axis C. The first wavelength conversion layer 130 is disposed on the first light conversion region A1 of the substrate 120a. The second wavelength conversion layer 140 is disposed on the second light conversion region A2 of the substrate 120a. The first wavelength conversion layer 130 is, for example, a yellow wavelength conversion layer for generating yellow light, and the second wavelength conversion layer 140 is, for example, a green wavelength conversion layer for generating green light, but the invention is not limited thereto. A width of the first wavelength conversion layer 130 is, for example, less than or equal to the width W of the outer periphery 125 parallel to the extending direction D.

Further, in the embodiment, the substrate 120a and the driving assembly 110 are disposed coaxially, where the substrate 120a may be a high thermally conductive transparent substrate or a high thermally conductive opaque substrate that is made of, for example, sapphire, aluminum nitride, aluminum oxide, ceramic composite material, or metal alloy, but the invention is not limited thereto. Furthermore, the color wheel module 100a of the embodiment further includes a first reflecting layer 150 and a second reflecting layer 160. The first reflecting layer 150 is disposed on the first light conversion region A1 of the substrate 120a, and the first reflecting layer 150 is located between the first wavelength conversion layer 130 and the outer periphery 125 of the substrate 120a. The second reflecting layer 160 is disposed on the second light conversion region A2 of the substrate 120a, and the second reflecting layer 160 is located between the second wavelength conversion layer 140 and the first surface 127 of the substrate 120a. In the embodiment, the first wavelength conversion layer 130, the second wavelength conversion layer 140, the first reflecting layer 150, and the second reflecting layer 160 are respectively a ring structure, and the first reflecting layer 150 and the second reflecting layer 160 may be respectively a coated mirror reflecting layer, a coated diffuse reflecting layer, or a combination of the above two types of coatings. In addition, as shown in FIG. 2C and FIG. 2D, the color wheel module 100a of the embodiment further includes an adhesive layer 180, where the adhesive layer 180 is disposed between the driving assembly 110 and the substrate 120a, and the driving member 110 is connected to the substrate 120a through the adhesive layer 180. In addition, a balance material 170 may also be disposed on the substrate 120a to implement balance correction to dynamic balance of the color wheel module 100A.

Referring to FIG. 2A, FIG. 2B and FIG. 2E, in the embodiment, the light source device 13 includes a light source 13a and a light source 13b for respectively providing a first excitation beam L11 and a second excitation beam L12, where the first excitation beam L11 is incident to the first light conversion region A1 of the outer periphery 125 of the substrate 120a along a direction perpendicular to the central axis C after passing through the lens 15 is converted into a first color converted beam L11'. The first color converted beam L11' is sequentially reflected by the first reflecting layer 150 (referring to FIG. 2C and FIG. 2D) and a mirror 17 to form a first color light F1, such as yellow light. The mirror 17 located between the light source 13a and the outer periphery 125 is a dichroic mirror for allowing the first excitation beam L11 to pass through and reflecting the first color converted beam L11'. The second excitation beam L12 emitted by the light source 13b is incident to the second light conversion region A2 of the first surface 127 of the substrate 120a along a direction parallel to the central axis C after passing through another lens 15, and is converted into a second color converted beam L12'. The second color converted beam L12' is sequentially reflected by the second reflecting layer 160 (referring to FIG. 2C and FIG. 2D) and the mirror 17 to form a second color light F2, such as green light. The mirror 17 located between the light source 13b and the first surface 127 is a dichroic mirror for allowing the second excitation beam L12 to pass through and reflecting the second color converted beam L12. As shown in FIG. 1 and FIG. 2E, the illumination beam L1 of the embodiment includes at least one of the first color converted beam L11' (the first color light F1) and the second color converted beam L12' (the second color light F2).

In brief, in the color wheel module 100a of the embodiment, the yellow first wavelength conversion layer 130 is disposed on the first light conversion region A1 of the outer periphery 125 of the substrate 120a, and the green second wavelength conversion layer 140 is disposed on the second light conversion region A2 of the first surface 127 of the substrate 120a. In this way, there is no need to control the timing to sequentially generate the green light and yellow light, and the light beams with different colors may be provided at the same time, thereby improving the application efficiency of the excitation light. Meanwhile, since connecting areas of the first wavelength conversion layer 130 and the second wavelength conversion layer 140 with the substrate 120a are at least doubled respectively, the heat dissipation efficiency of the wavelength conversion layer is also greatly improved, and the color wheel module 100a of the embodiment may have better heat dissipation effect. Compared with the prior art of only disposing the wavelength conversion layer on the radial disk surface of the heat dissipation substrate, the configuration method of the embodiment may increase the heat dissipation efficiency of the color wheel module 100a from 100% to 300%, and may also increase the excitation efficiency from 100% to 300%, and it is unnecessary to adopt timing control to only generate a color light of one wavelength conversion layer at the same time. Moreover, through the above configuration method, it may increase flexibility of a spatial design of a system optical engine and flexibility of an optical path design of the system optical engine, and also reduces the manufacturing cost of the projection device 10. In addition, the projection device 10 using the color wheel module 100a of the embodiment may have better projection quality and product competitiveness.

It should be noted that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
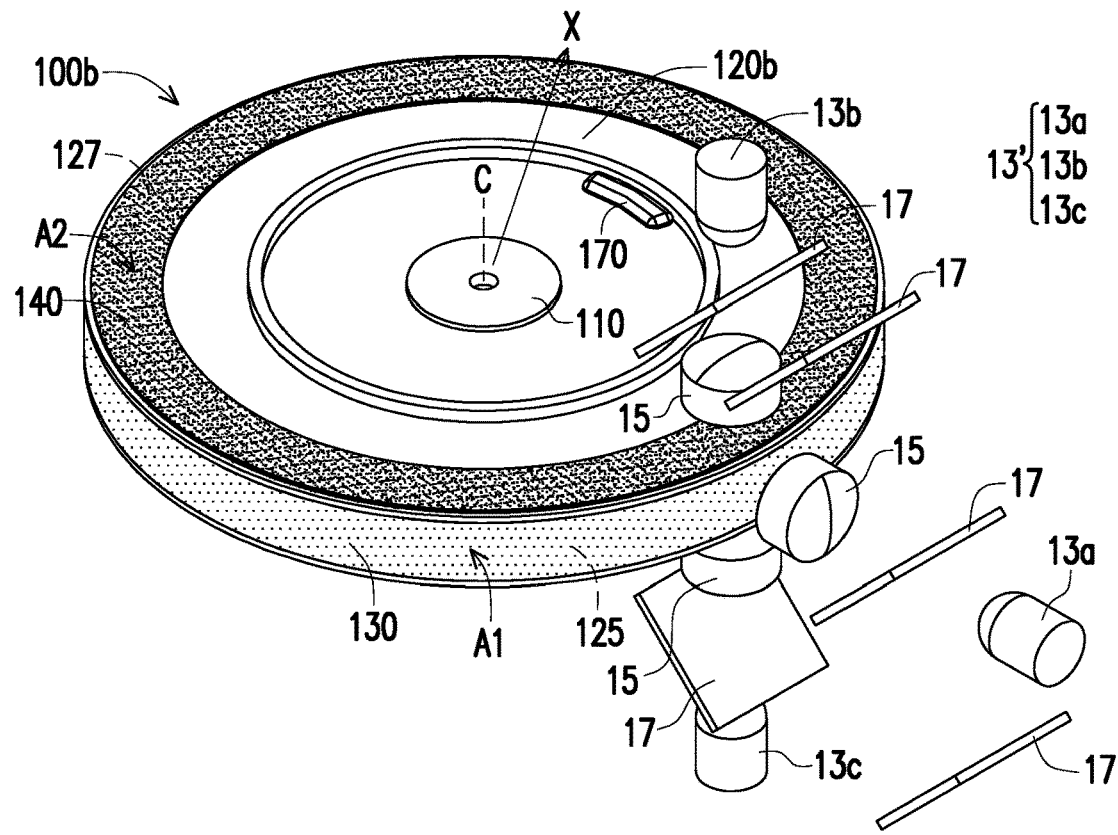
FIG. 3A is a three-dimensional schematic view of relative positions of a color wheel module and a light guide element of a projection device according to an embodiment of the invention.
Figure 3B:
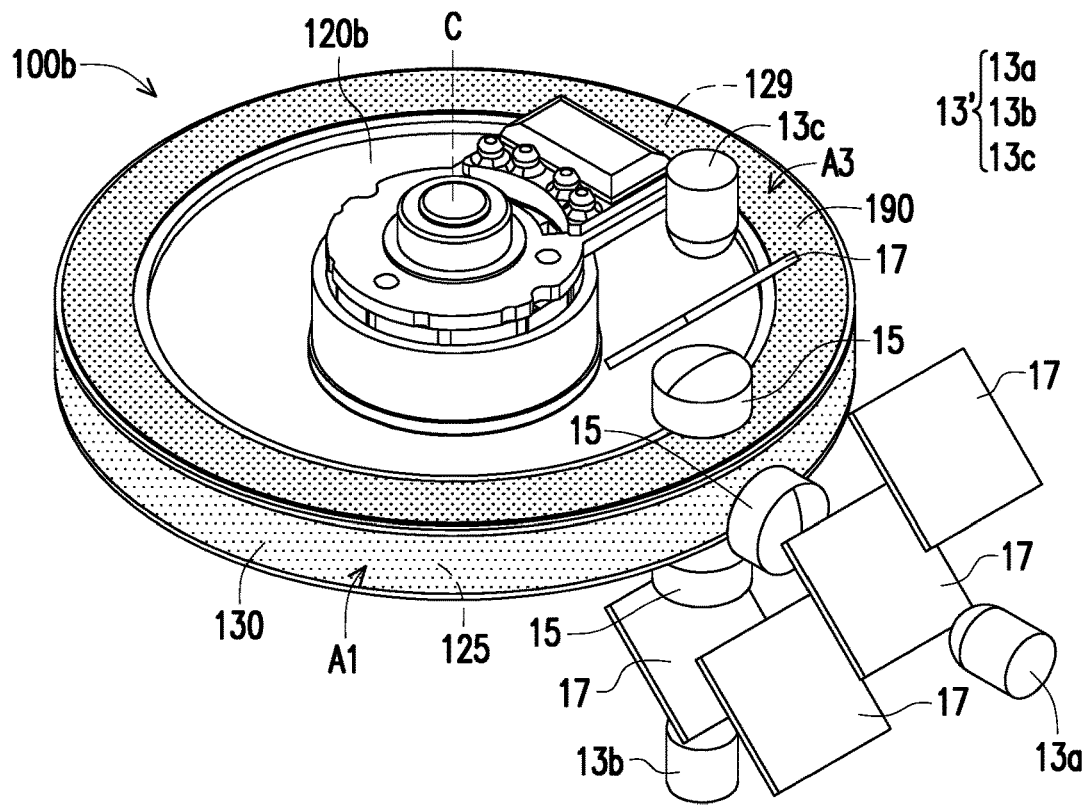
FIG. 3B is a three-dimensional schematic view of the relative positions of the color wheel module and the light guide element of FIG. 3A from another viewing angle.
Figure 3C:
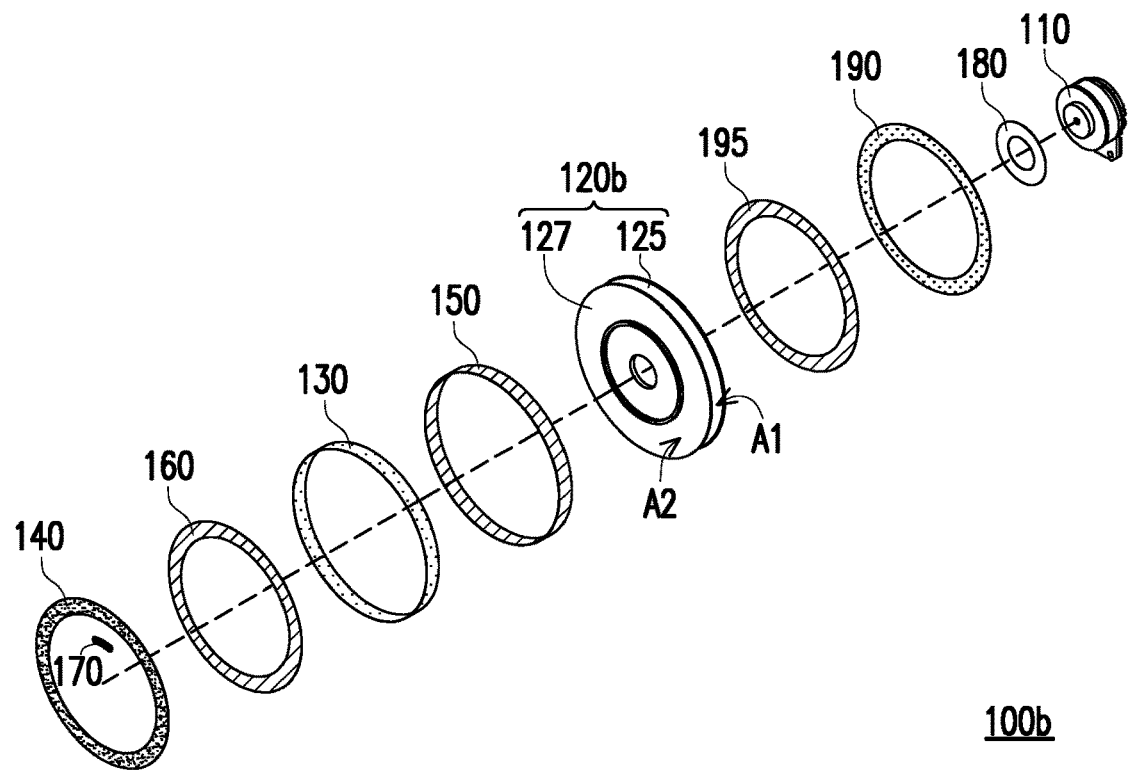
FIG. 3C is a three-dimensional exploded schematic view of the color wheel module of FIG. 3A.
Figure 3D:
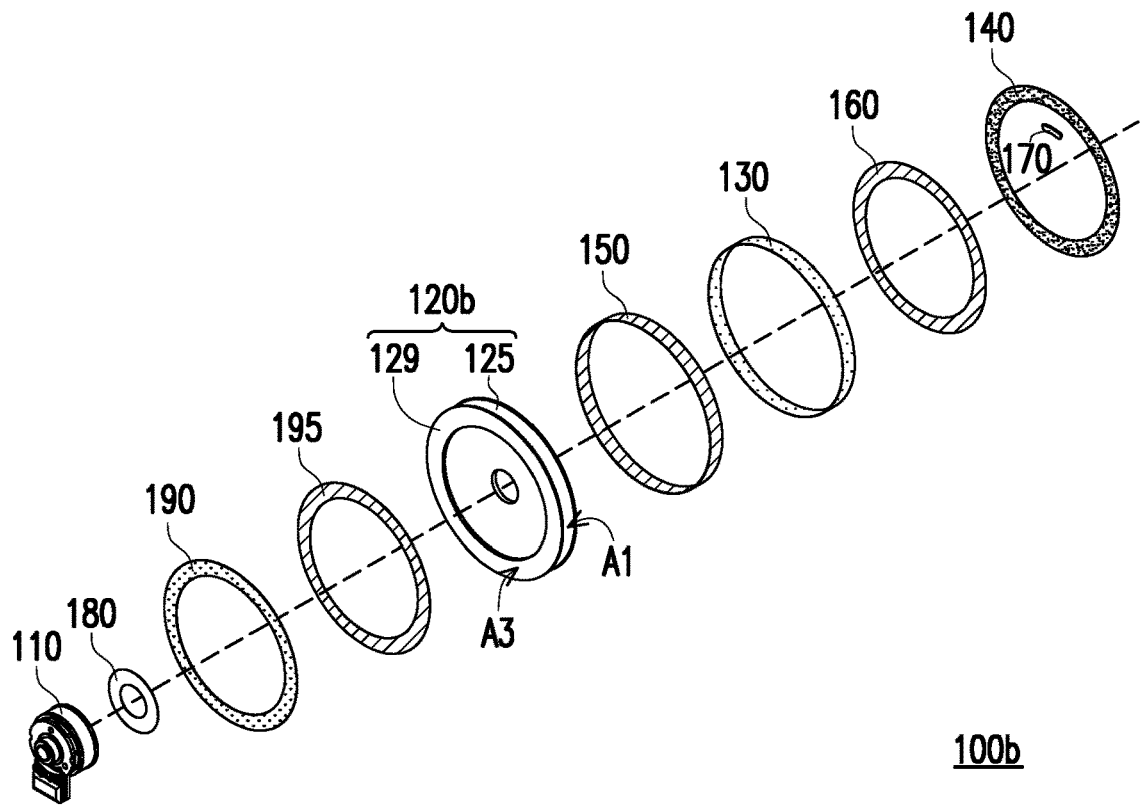
FIG. 3D is a three-dimensional exploded schematic view of the color wheel module of FIG. 3A from another viewing angle.
Figure 3E:
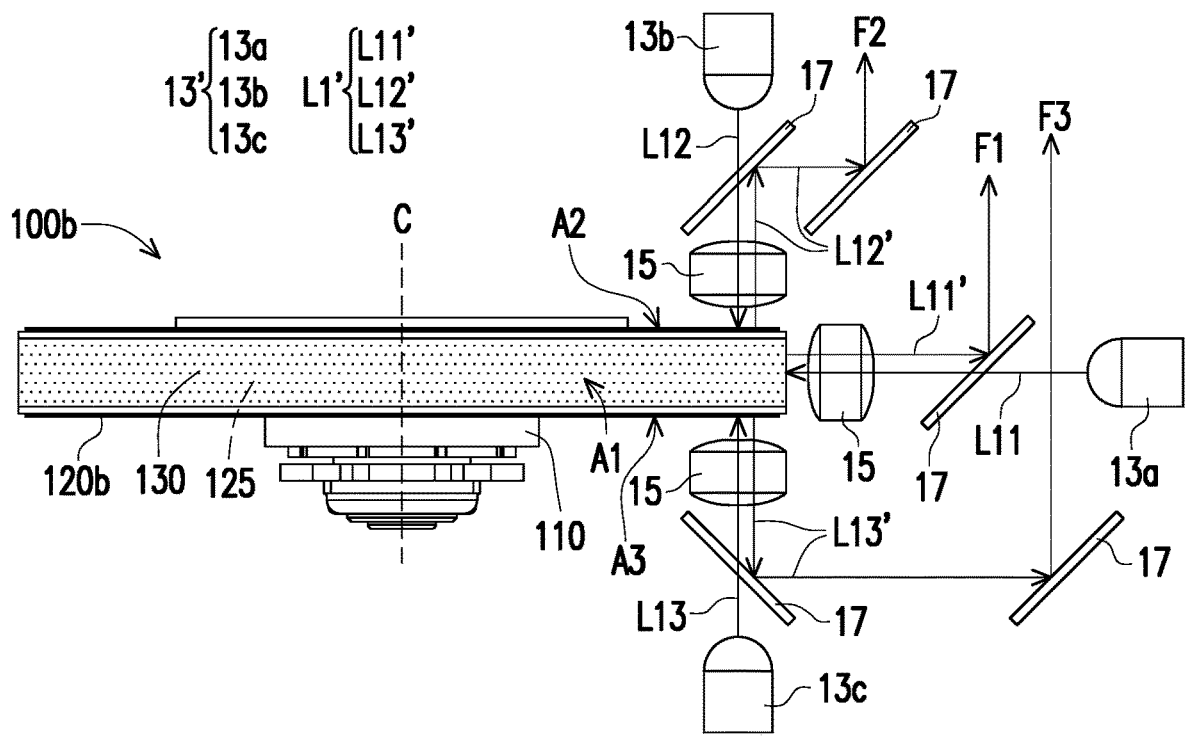
FIG. 3E is a schematic side view of the relative positions of the color wheel module and the light guide element of FIG. 3A.

FIG. 3A is a three-dimensional schematic view of relative positions of a color wheel module and a light guide element of a projection device according to an embodiment of the invention. FIG. 3B is a three-dimensional schematic view of the relative positions of the color wheel module and the light guide element of FIG. 3A from another viewing angle. FIG. 3C is a three-dimensional exploded schematic view of the color wheel module of FIG. 3A. FIG. 3D is a three-dimensional exploded schematic view of the color wheel module of FIG. 3A from another viewing angle. FIG. 3E is a schematic side view of the relative positions of the color wheel module and the light guide element of FIG. 3A.

Referring to FIG. 2A, FIG. 2B, FIG. 3A, and FIG. 3B at the same time, a color wheel module 100b of the embodiment is similar to the color wheel module 100a of FIG. 2B, and a difference there between is that in the embodiment, the substrate 120b further includes a second surface 129 perpendicular to the central axis C and opposite to the first surface 127, and further has a third light conversion region A3 located on the second surface 129. The first surface 127 and the second surface 129 are the opposite surfaces of the substrate 120b. The first surface 127 and the second surface 129 are, for example, connected to the outer periphery 125, and the second disk surface 129 is parallel to the radial direction R. Moreover, the color wheel module 100b of the embodiment further includes a third wavelength conversion layer 190, which is, for example, a red wavelength conversion layer for generating red light, where the third wavelength conversion layer 190 is disposed on the third light conversion region A3 of the second disk surface 129 of the substrate 120b. In addition, referring to FIG. 3C and FIG. 3D at the same time, the color wheel module 100b of the embodiment further includes a third reflecting layer 195, where the third reflecting layer 195 is disposed on the third light conversion region A3 of the substrate 120b, and the third reflecting layer 195 is located between the third wavelength conversion layer 190 and the second disk surface 197 of the substrate 120b.

Referring to FIG. 3A, FIG. 3B and FIG. 3E at the same time, in the embodiment, the light source device 13' includes a light source 13a, a light source 13b, and a light source 13c for respectively providing a first excitation beam L11, a second excitation beam L12, and a third excitation beam L13, where the first excitation beam L11 is incident to the first light conversion region A1 of the outer periphery 125 of the substrate 120b along the direction perpendicular to the central axis C after passing through the lens 15 and is converted into the first color converted beam L11'. The first color converted beam L11' is sequentially reflected by the first reflecting layer 150 (referring to FIG. 3C and FIG. 3D) and the mirror 17 to form the first color light F1, such as yellow light. The second excitation beam L12 emitted by the light source 13b is incident to the second light conversion region A2 of the first surface 127 of the substrate 120b along a direction parallel to the central axis C after passing through another lens 15, and is converted into the second color converted beam L12'. The second color converted beam L12' is sequentially reflected by the second reflecting layer 160 (referring to FIG. 3C and FIG. 3D) and the mirror 17 to form the second color light F2, such as green light. The third excitation beam L13 emitted by the light source 13c is incident to the third light conversion region A3 of the second surface 129 of the substrate 120b along the direction parallel to the central axis C after passing through another lens 15, and is converted into a third color converted beam L13'. The third color converted beam L13' is sequentially reflected by the third reflecting layer 195 (referring to FIG. 3C and FIG. 3D) and the mirror 17 to form a third color light F3, such as red light. Where, each mirror 17 is a dichroic mirror for allowing the blue excitation beam (the first excitation beam L11, the second excitation beam L12, and the third excitation beam L13) to pass through and reflect other color lights (the first color converted beam L11', the second color converted beam L12' and the third color converted beam L13'). The illumination beam L1 ' includes at least one of the first color converted beam L11' (the first color light F1), the second color converted beam L12' (the second color light F2), and the third color converted beam L13' (the third color light F3).

In brief, in the color wheel module 100b of the embodiment, the yellow first wavelength conversion layer 130 is disposed on the first light conversion region A1 of the outer periphery 125 of the substrate 120b, the green second wavelength conversion layer 140 is disposed on the second light conversion region A2 of the first surface 127 of the substrate 120b, and the red third wavelength conversion layer 190 is disposed on the third light conversion region A2 of the second surface 129 of the substrate 120b. In this way, there is no need to control timing to sequentially generate the yellow light, green light and red light, so as to improve the application efficiency of the excitation light. Meanwhile, since connecting areas of the first wavelength conversion layer 130, the second wavelength conversion layer 140 and the third wavelength conversion layer 190 with the substrate 120b are respectively increased by at least twice, the heat dissipation efficiency of the wavelength conversion layer is also greatly improved, and the color wheel module 100b of the embodiment may have better heat dissipation effect.

Figure 4A:
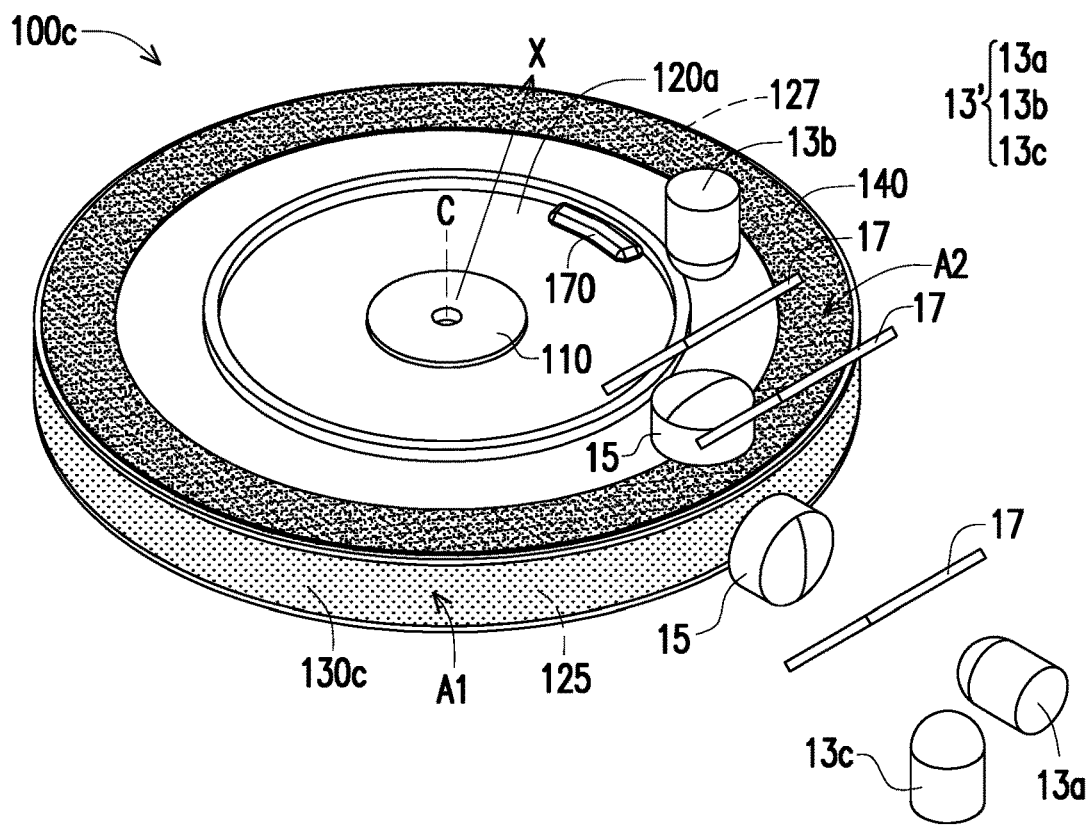
FIG. 4A is a three-dimensional schematic view of relative positions of a color wheel module and a light guide element of a projection device according to another embodiment of the invention.
Figure 4B:
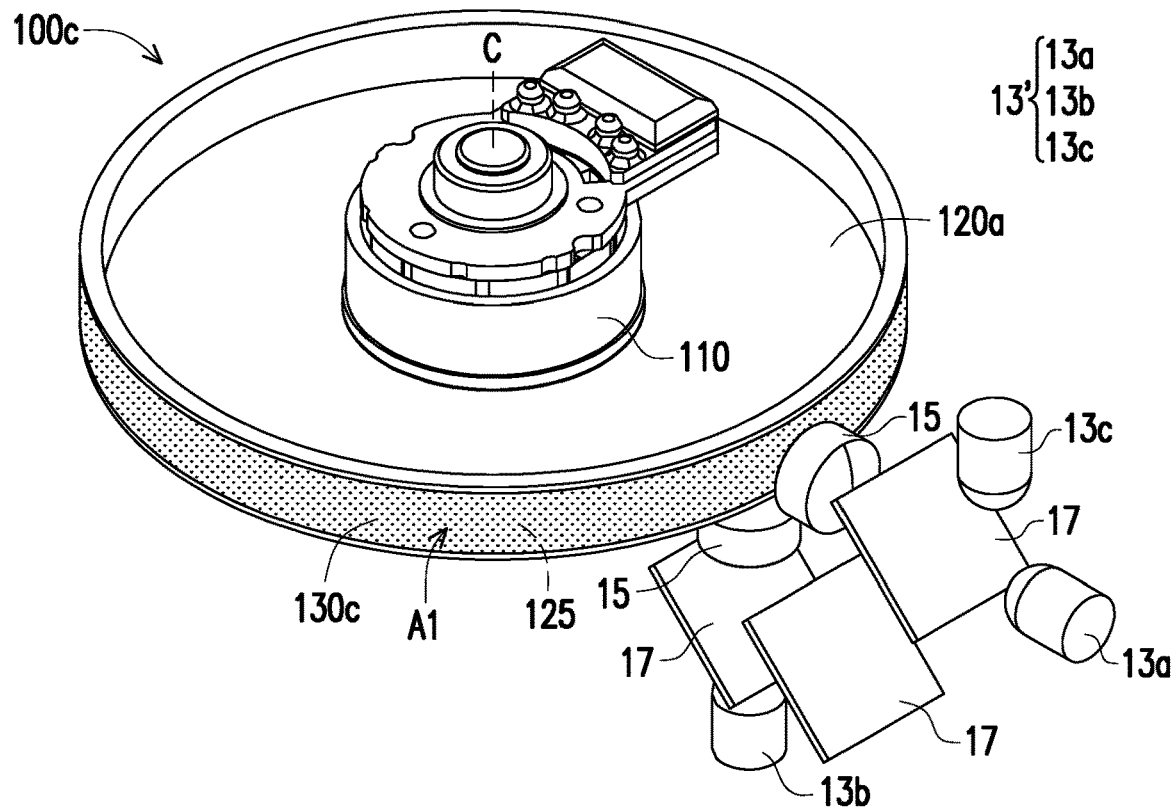
FIG. 4B is a three-dimensional schematic view of the relative positions of the color wheel module and the light guide element of FIG. 4A from another viewing angle.
Figure 4C:
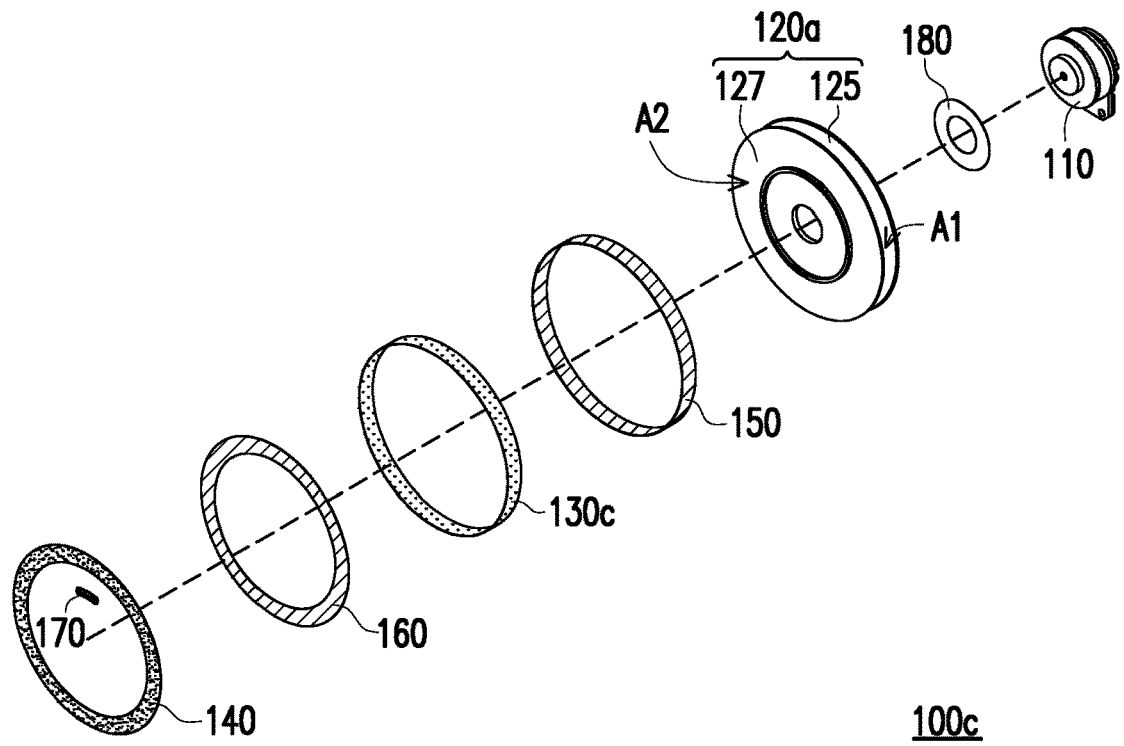
FIG. 4C is a three-dimensional exploded schematic view of the color wheel module of FIG. 4A.
Figure 4D:
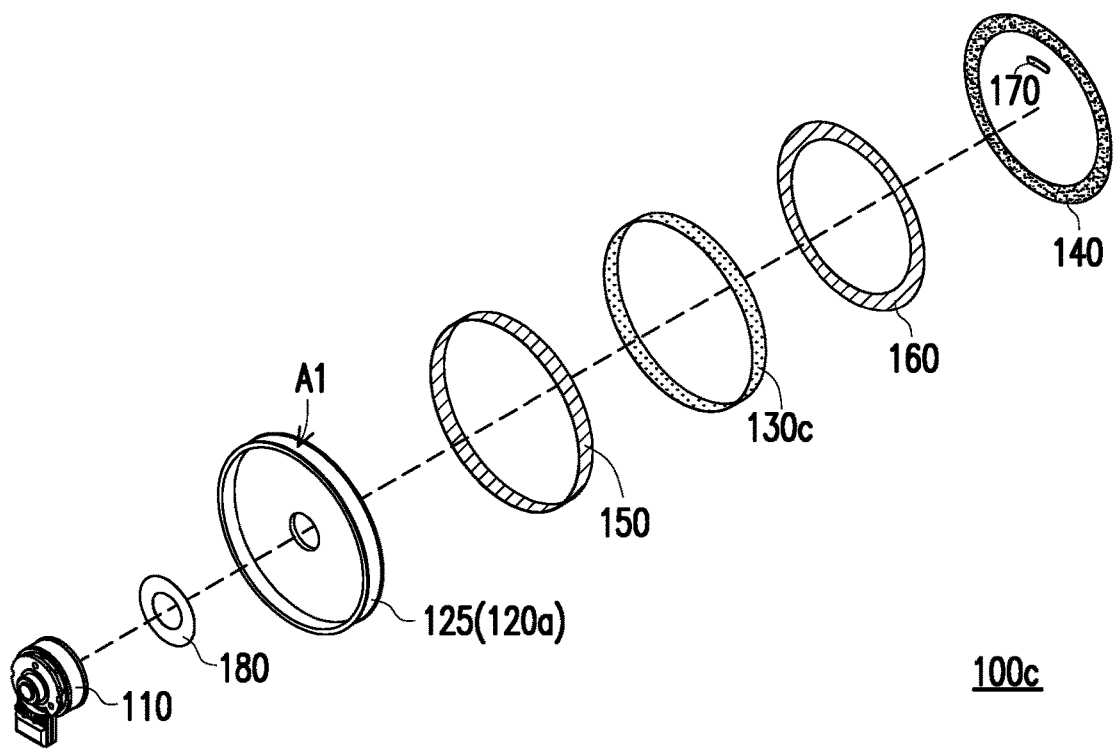
FIG. 4D is a three-dimensional exploded schematic view of the color wheel module of FIG. 4A from another viewing angle.
Figure 4E:
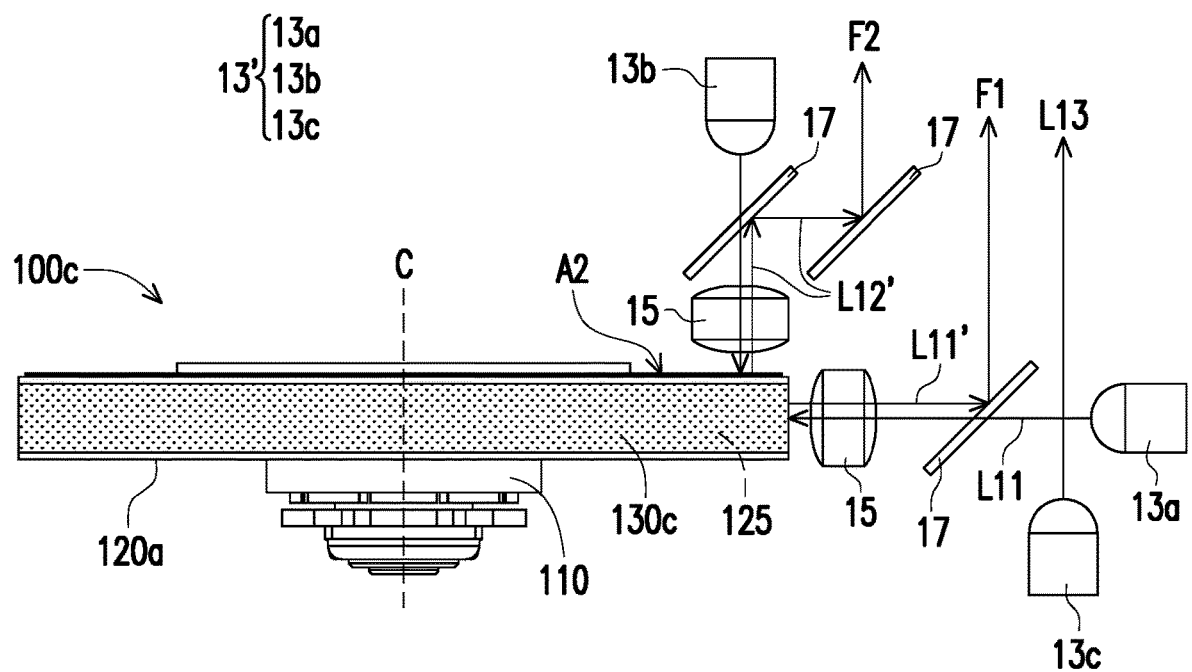
FIG. 4E is a schematic side view of the relative positions of the color wheel module and the light guide element of FIG. 4A.

FIG. 4A is a three-dimensional schematic view of relative positions of a color wheel module and a light guide element of a projection device according to another embodiment of the invention. FIG. 4B is a three-dimensional schematic view of the relative positions of the color wheel module and the light guide element of FIG. 4A from another viewing angle. FIG. 4C is a three-dimensional exploded schematic view of the color wheel module of FIG. 4A. FIG. 4D is a three-dimensional exploded schematic view of the color wheel module of FIG. 4A from another viewing angle. FIG. 4E is a schematic side view of the relative positions of the color wheel module and the light guide element of FIG. 4A.

Referring to FIG. 2A, FIG. 2B, FIG. 4A, and FIG. 4B at the same time, a color wheel module 100c of the embodiment is similar to the color wheel module 100a of FIG. 2B, and a difference there between is that in the embodiment, a first wavelength conversion layer 130c is disposed on the first light conversion region A1 of the substrate 120a, where the first wavelength conversion layer 130c is, for example, a red wavelength conversion layer, but the invention is not limited thereto. The second wavelength conversion layer 140 is disposed on the second light conversion region A2 of the substrate 120a, where the second wavelength conversion layer 140 is, for example, a green wavelength conversion layer, but the invention is not limited thereto.

Referring to FIG. 4A, FIG. 4B and FIG. 4E at the same time, in the embodiment, the light source 13a of the light source device 13' provides the first excitation beam L11, and the first excitation beam L11 is incident to the first light conversion region A1 of the substrate 120a along the direction perpendicular to the central axis C and is converted into the first color converted beam L11'. The first color converted beam L11' is sequentially reflected by the first reflecting layer 150 (referring to FIG. 4C and FIG. 4D) and the mirror 17 to form the first color light F1, such as red light. The first color light F1 is reflected by the mirror 17 to be transmitted along the direction parallel to the central axis C. The light source 13b of the light source device 13' provides the second excitation beam L12, and the second excitation beam L12 is incident to the second light conversion region A2 of the substrate 120a along the direction parallel to the central axis C, and is converted into the second color converted beam L12'. The second color converted beam L12' is sequentially reflected by the second reflecting layer 160 (referring to FIG. 4C and FIG. 4D) and the mirror 17 to form the second color light F2, such as green light. The second color light F2 is reflected by the mirror 17 to be transmitted along the direction parallel to the central axis C. The light source 13c of the light source device 13' provides the third excitation beam L13 (for example, blue light), and the third excitation beam L13 does not pass through the color wheel module 100c, but is directly combined with the first color light F1 and the second color light F2. In this embodiment, the third excitation beam L13 is transmitted along the direction parallel to the central axis C. In other words, the color wheel module 100c of the embodiment simultaneously outputs light beams with three colors such as the green light, the red light, and the blue light.

In summary, the embodiments of the invention have at least one of the following advantages or effects. In the design of the color wheel module of the invention, the first wavelength conversion layer is disposed on the first light conversion region of the outer periphery of the substrate, and the second wavelength conversion layer is disposed on the second light conversion region of the first surface of the substrate, where the first excitation beam is incident to the first light conversion region of the substrate in a direction perpendicular to the central axis and is converted into the first color converted beam, and the second excitation beam is incident to the second light conversion region of the substrate in a direction parallel to the central axis and is converted into the second color converted beam. In this way, there is no need to generate excitation light of different colors through timing control, which improves application efficiency of the excitation light. At the same time, since bonding areas of the first wavelength conversion layer and the second wavelength conversion layer with the substrate are at least doubled, heat dissipation efficiency of the wavelength conversion layer is also greatly improved, and the color wheel module of the invention has a better heat dissipation effect. Furthermore, through the configuration method, flexibility in spatial design of the system optical engine may be increased. In addition, the projection device using the color wheel module of the invention may have better projection quality and product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A color wheel module, adapted to be disposed on a transmission path of a first excitation beam and a second excitation beam, wherein the color wheel module comprises a driving assembly, a substrate, a first wavelength conversion layer, and a second wavelength conversion layer, wherein
    the substrate is connected to a rotating shaft of the driving assembly, and the driving assembly drives the substrate to rotate while taking the rotating shaft of the driving assembly as a central axis;
    the substrate comprises an outer periphery disposed around the central axis and a first surface perpendicular to the central axis and has a first light conversion region located on the outer periphery and a second light conversion region located on the first surface, an included angle is formed between an extending direction of the outer periphery and a radial direction of the substrate, and the outer periphery has a width parallel to the extending direction;
    the first wavelength conversion layer is disposed on the first light conversion region of the substrate; and
    the second wavelength conversion layer is disposed on the second light conversion region of the substrate;
    wherein the first excitation beam is incident to the first light conversion region of the substrate along a direction perpendicular to the central axis and is converted into a first color converted beam, and the second excitation beam is incident to the second light conversion region of the substrate along a direction parallel to the central axis and is converted into a second color converted beam.

2. The color wheel module as claimed in claim 1, wherein the included angle is greater than 0 and less than or equal to 90 degrees.

3. The color wheel module as claimed in claim 1, further comprising:
    a first reflecting layer, disposed on the first light conversion region of the substrate, wherein the first reflecting layer is located between the first wavelength conversion layer and the outer periphery; and
    a second reflecting layer, disposed on the second light conversion region of the substrate, wherein the second reflecting layer is located between the second wavelength conversion layer and the first surface.

4. The color wheel module as claimed in claim 3, wherein the first color converted beam is reflected by the first reflecting layer to form first color light, and the second color converted beam is reflected by the second reflecting layer to form second color light.

5. The color wheel module as claimed in claim 4, wherein a third excitation beam is combined with the first color light and the second color light without passing through the color wheel module.

6. The color wheel module as claimed in claim 1, further comprising:
    a third wavelength conversion layer, wherein the substrate further comprises a second surface perpendicular to the central axis and opposite to the first surface, the substrate further comprises a third light conversion region on the second disk surface, and the third wavelength conversion layer is disposed on the third light conversion region of the substrate, wherein
    the third excitation beam is incident to the third light conversion region of the substrate along a direction parallel to the central axis and is converted into a third color converted beam.

7. The color wheel module as claimed in claim 6, further comprising:
    a first reflecting layer, disposed on the first light conversion region of the substrate, wherein the first reflecting layer is located between the first wavelength conversion layer and the outer periphery;
    a second reflecting layer, disposed on the second light conversion region of the substrate, wherein the second reflecting layer is located between the second wavelength conversion layer and the first surface; and
    a third reflecting layer, disposed on the third light conversion region of the substrate, wherein the third reflecting layer is located between the third wavelength conversion layer and the second surface.

8. The color wheel module as claimed in claim 7, wherein the first color converted beam is reflected by the first reflecting layer to form first color light, the second color converted beam is reflected by the second reflecting layer to form second color light, and the third color converted beam is reflected by the third reflecting layer to form third color light.

9. A projection device, comprising an illumination module, a light valve, and a projection lens, wherein the illumination module comprises a light source device, a lens, and a color wheel module, the illumination module is configured for providing an illumination beam, the light source device is configured to provide a first excitation beam and a second excitation beam, the color wheel module is disposed on a transmission path of the first excitation beam and the second excitation beam, the color wheel module is located between the light source device and the light valve, the lens is located between the light source device and the color wheel module, and the color wheel module comprises a driving assembly, a substrate, a first wavelength conversion layer, and a second wavelength conversion layer; wherein the substrate is connected to a rotating shaft of the driving assembly, and the driving assembly drives the substrate to rotate while taking the rotating shaft of the driving assembly as a central axis;

the substrate comprises an outer periphery disposed around the central axis and a first surface perpendicular to the central axis and has a first light conversion region located on the outer periphery and a second light conversion region located on the first surface, an included angle is formed between an extending direction of the outer periphery and a radial direction of the substrate, and the outer periphery has a width parallel to the extending direction;

the first wavelength conversion layer is disposed on the first light conversion region of the substrate; and the second wavelength conversion layer is disposed on the second light conversion region of the substrate;

wherein the first excitation beam is incident to the first light conversion region of the substrate along a direction perpendicular to the central axis and is converted into a first color converted beam, and the second excitation beam is incident to the second light conversion region of the substrate along a direction parallel to the central axis and is converted into a second color converted beam, and the illumination beam comprises at least one of the first color converted beam and the second color converted beam;

the light valve is disposed on a transmission path of the illumination beam to convert the illumination beam into an image beam; and the projection lens is disposed on a transmission path of the image beam to project the image beam out of the projection device.

10. The projection device as claimed in claim 9, wherein the light source device further provides a third excitation beam, the color wheel module further comprises a third wavelength conversion layer, the substrate further comprises a second surface perpendicular to the central axis and opposite to the first surface and further has a third light conversion region on the second surface, the third wavelength conversion layer is disposed on the third light conversion region of the substrate, the third excitation beam is incident to the third light conversion region of the substrate along a direction parallel to the central axis and is converted into a third color converted beam, and the illumination beam comprises the third color converted beam.

* * * * *